J. PHILLIPS.
Wind-Wheel Governor.

No. 199,464. Patented Jan. 22, 1878.

WITNESSES:
C. Neveux
J. H. Scarborough

INVENTOR:
J. Phillips.
BY Munn & Co
ATTORNEYS.

UNITED STATES PATENT OFFICE.

JAMES PHILLIPS, OF JEWELL CITY, KANSAS.

IMPROVEMENT IN WIND-WHEEL GOVERNORS.

Specification forming part of Letters Patent No. 199,464, dated January 22, 1878; application filed September 10, 1877.

*To all whom it may concern:*

Figures 1, 2:
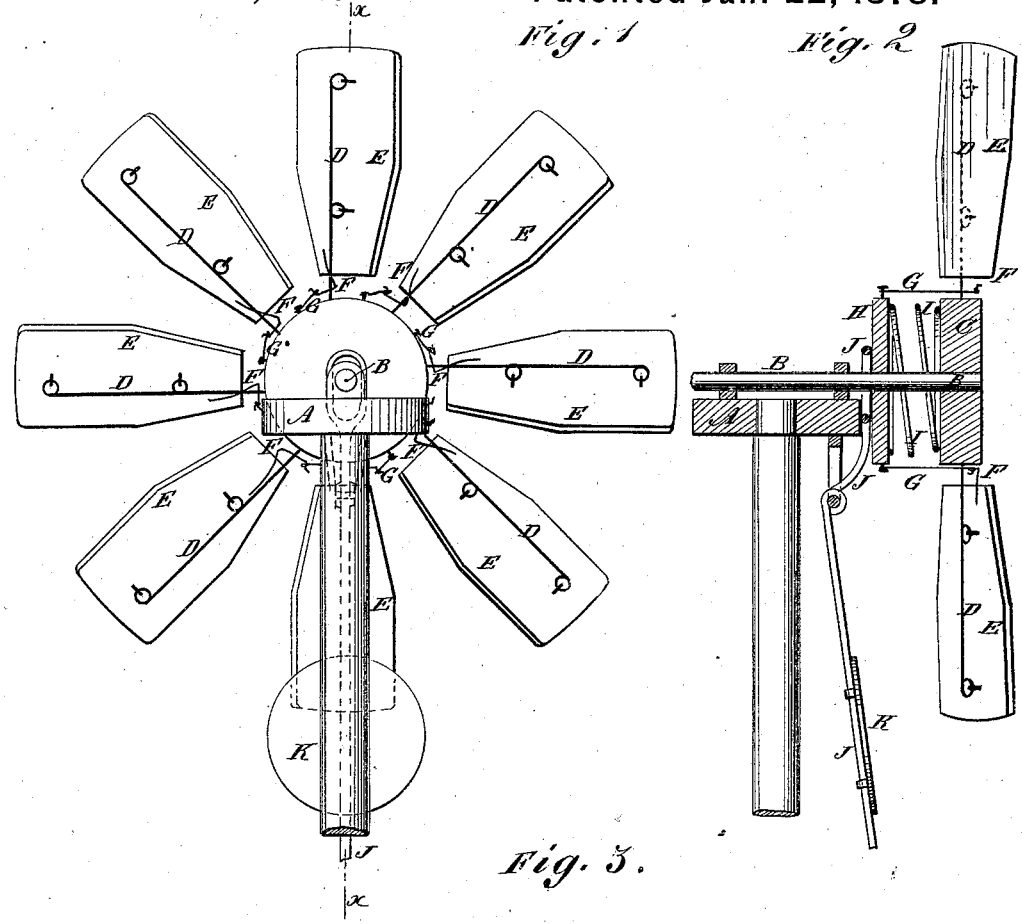
Figure 3:
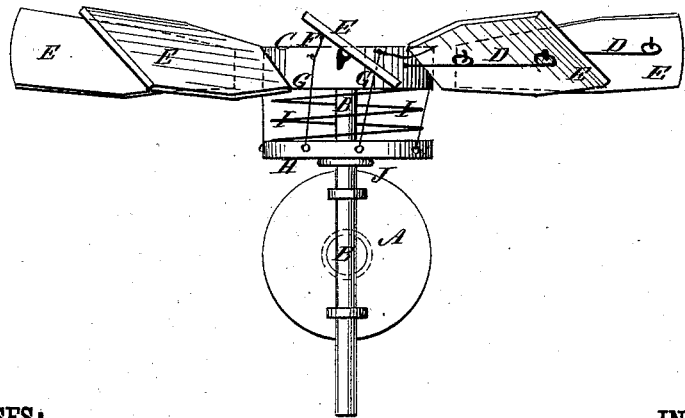

Be it known that I, JAMES PHILLIPS, of Jewell City, in the county of Jewell and State of Kansas, have invented a new and useful Improvement in Wind-Wheel Governors, of which the following is a specification:

Figure 1 is a rear view of a wind-wheel to which my improved governor has been applied. Fig. 2 is a vertical section of the same, taken through the line $x\ x$, Fig. 1. Fig. 3 is a top view of the same.

Similar letters of reference indicate corresponding parts.

The object of this invention is to furnish an improved device for attachment to wind-wheels, which shall be so constructed as to throw the wheel out of and into the wind more or less, as the wind increases and diminishes in force, and to throw it entirely out of the wind should it become a storm, and which shall be simple in construction and reliable in use.

The invention consists in the combination of the levers or cranks, the connecting-rods, the disk, the spring or springs, the lever and its wing with the shaft, the hub, and the wings of the wheel, and the turn-table, as hereinafter fully described.

A represents the turn-table, which is pivoted to the tower or frame in the usual way, and in bearings attached to which the wheel-shaft B revolves. To the forward end of the shaft B is attached the hub C of the wind-wheel, to which are attached a number of radial arms, D. E are the wings, which are hinged about upon their central lines, and near their outer and inner ends to the radial arms D. To the forward lower corners of the wings E are attached levers or crank-arms F, to the ends of which are pivoted the forward ends of the connecting-rods G. Some or all of the rods G pass through the keepers attached to the hub C, and their rear ends are pivoted to the rim of the wheel H, which slides upon the wheel-shaft B in the rear of the hub C, and which is held back from said hub by the spiral spring I, interposed between it and the said hub C. The same thing may be accomplished by small spiral springs connected with the inner corners of the wings E. To the turn-table A, or to a support attached to said turn-table, is pivoted a lever, J, the upper end of which has an eye formed in it to receive the wheel-shaft B. The upper end of the lever J is placed upon the shaft B in the rear of the disk H, and to its lower end is attached a wing, K, which should be adjustably secured in place, so that it may be adjusted to make the machine more or less sensitive to changes in the force of the wind.

With this construction, as the wind increases in force it presses back the wing K, and operates the lever J to press the disk H forward, compressing the spring or springs I, and turning the wings E out of the wind. As the force of the wind decreases, the spring or springs I press back the disk H, and turn the wings E into the wind.

By this construction the wheel will be made to revolve at a uniform speed, however the force of the wind may vary.

The wind-wheel should be provided with a vane in the ordinary way, to keep it turned toward the wind.

Having thus described my invention, what I claim as new, and desire to secure by Letters Patent, is—

The combination of the levers or cranks F, the connecting-rods G, the disk H, the spring or springs I, the lever J, and the wing K with the wheel-shaft B, the hub C, the wings E, and the turn-table A, substantially as herein shown and described.

JAMES PHILLIPS.

Witnesses:
D. L. PALMER,
ISAAC A. SAWIN.